(12) United States Patent
Jiang et al.

(10) Patent No.: US 12,717,627 B2
(45) Date of Patent: Aug. 25, 2026

(54) METHOD FOR RESOURCE RECOVERY, ELECTRONIC DEVICE, AND PROGRAM PRODUCT

(71) Applicant: Dell Products L.P., Round Rock, TX (US)

(72) Inventors: Ellie Jiang, Chengdu (CN); Robin Wang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 705 days.

(21) Appl. No.: 18/129,943

(22) Filed: Apr. 3, 2023

(65) Prior Publication Data

US 2023/0342204 A1 Oct. 26, 2023

(30) Foreign Application Priority Data

Apr. 20, 2022 (CN) ........................ 202210420558.X

(51) Int. Cl.
*G06F 9/46* (2006.01)
*G06F 9/50* (2006.01)

(52) U.S. Cl.
CPC .................................. *G06F 9/5022* (2013.01)

(58) Field of Classification Search
CPC .................................................... G06F 9/5022
See application file for complete search history.

(56) References Cited

U.S. PATENT DOCUMENTS

2020/0133551 A1* 4/2020 Jiang ..................... G06F 3/0631
2021/0390021 A1* 12/2021 Baughman .......... G06F 11/1469

* cited by examiner

*Primary Examiner* — Tammy E Lee
(74) *Attorney, Agent, or Firm* — Krishnendu Gupta; Lesley Leonessa

(57) ABSTRACT

Embodiments of the present disclosure provide a method for resource recovery, an electronic device, and a program product. The method may include determining a first association relation between a first quantity of a to-be-used resource in a system and time. The method may further include determining a second association relation between a second quantity of the to-be-recovered resource in the system and time on the basis of a plurality of received resource recovery tasks. In addition, the method may include changing the second association relation by adjusting a recovery sequence of the plurality of resource recovery tasks so as to reduce a difference between the first association relation and the second association relation within a predetermined period. Further, the method may include executing the plurality of resource recovery tasks on the basis of the adjusted recovery sequence.

19 Claims, 5 Drawing Sheets

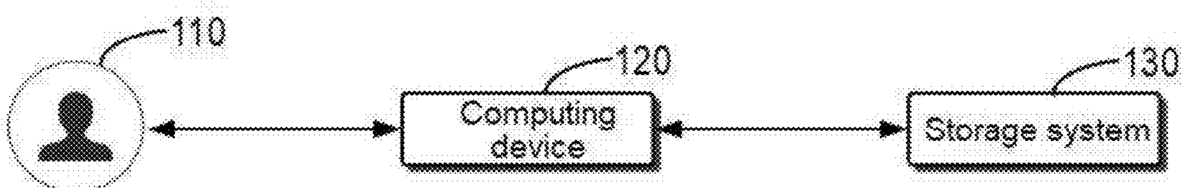
Fig. 1

300
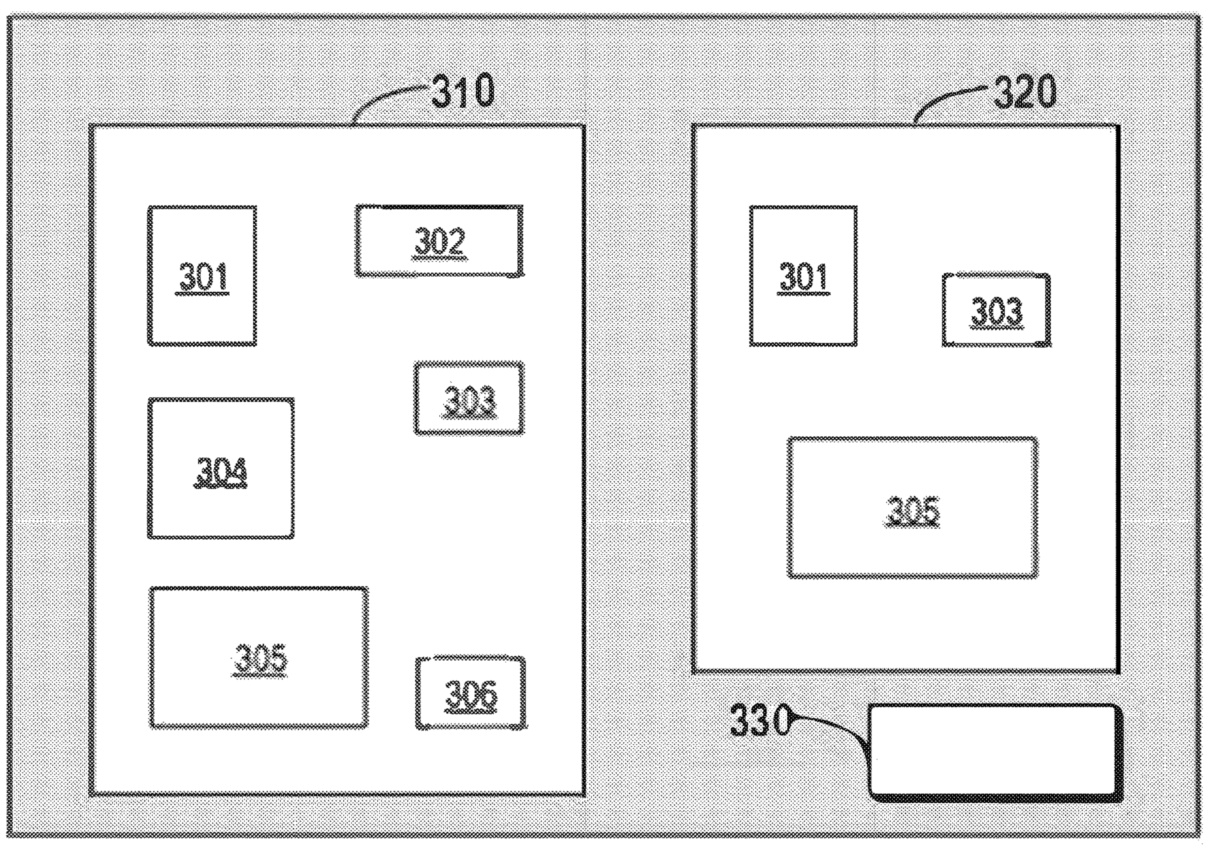
310
301
302
303
304
305
306
320
301
303
305
330

METHOD FOR RESOURCE RECOVERY, ELECTRONIC DEVICE, AND PROGRAM PRODUCT

TECHNICAL FIELD

Embodiments of the present disclosure relate to the field of computers, in particular to a method for resource recovery, an electronic device, and a program product.

BACKGROUND

A resource recovery technology used in the field of computers is usually used to increase a quantity of available resources by releasing resources that are not used or not often used, and ultimately improve the efficiency of resource usage. Taking a storage system as an example, a resource recovery operation corresponds to a recovery operation of storage space. It should be understood that the recovery operation of the storage space of the storage system is usually operated as a background task of the system. Therefore, each storage space recovery task takes a certain time. During this period of time, available storage space in the storage system may also be allocated and used. Therefore, both the recovery operation of the storage space and an allocation operation of the storage space affect a quantity of a current available storage space of the storage system. In a period of time, if a rate at which the available storage space is allocated is far higher than a rate at which a storage space under use is recovered, a problem of out of space (OOS) is very likely to occur, which is undesired by a user.

SUMMARY OF THE INVENTION

Embodiments of the present disclosure provide a solution for resource recovery.

In a first aspect of the present disclosure, a method for resource recovery is provided. The method may include determining a first association relation between a first quantity of a to-be-used resource in a system and time. The method may further include determining a second association relation between a second quantity of the to-be-recovered resource in the system and time on the basis of a plurality of received resource recovery tasks. In addition, the method may include changing the second association relation by adjusting a recovery sequence of the plurality of resource recovery tasks so as to reduce a difference between the first association relation and the second association relation within a predetermined period. Further, the method may include executing the plurality of resource recovery tasks on the basis of the adjusted recovery sequence.

In a second aspect of the present disclosure, an electronic device or system is provided and includes a processor; and a memory, coupled to the processor and having an instruction stored therein, wherein the instruction, when executed by the processor, causes the electronic device to execute actions, and the actions comprise: determining a first association relation between a first quantity of a to-be-used resource in a system and time; determining a second association relation between a second quantity of the to-be-recovered resource in the system and time on the basis of a plurality of received resource recovery tasks; changing the second association relation by adjusting a recovery sequence of the plurality of resource recovery tasks so as to reduce a difference between the first association relation and the second association relation within a predetermined period; and executing the plurality of resource recovery tasks on the basis of the adjusted recovery sequence.

In a third aspect of the present disclosure, a computer program product is provided, the computer program product is tangibly stored on a computer-readable medium and includes a machine-executable instruction, and the machine-executable instruction, when executed, causes a machine to execute any one of steps of the method according to the first aspect.

The Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

Exemplary embodiments of the present disclosure are described in more detail with reference to the accompanying drawings, and consequently the above and other objectives, features, and advantages of the present disclosure will become more apparent, wherein identical or similar reference numbers generally represent identical or similar components in the exemplary embodiments of the present disclosure. In the drawings:

FIG. 1 shows a schematic diagram of an example environment according to an embodiment of the present disclosure;

FIG. 3 shows a schematic diagram of a user interface for determining a resource recovery task according to an embodiment of the present disclosure;

DETAILED DESCRIPTION

Figure 2:
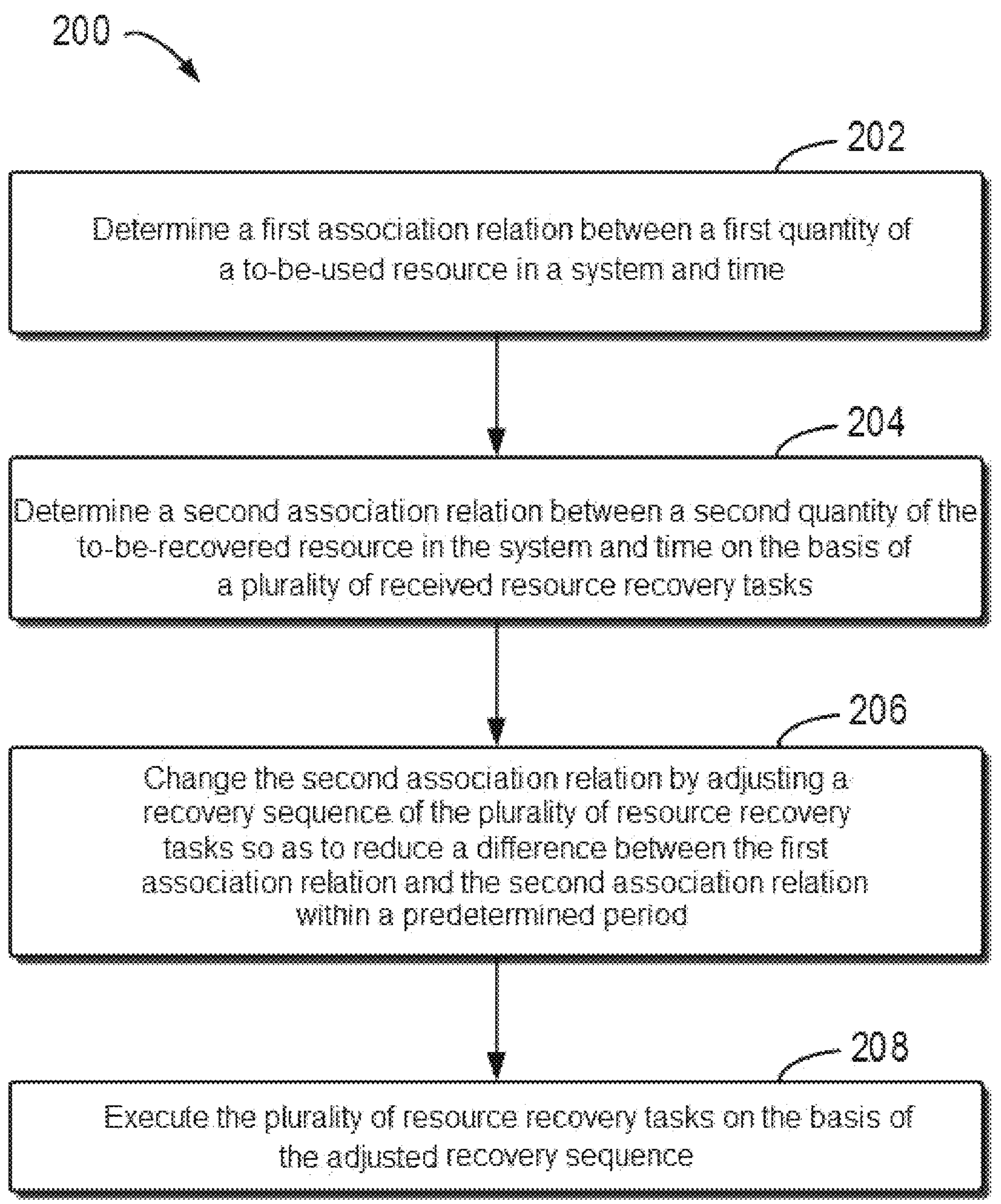
FIG. 2 shows a flowchart of a process for resource recovery according to an embodiment of the present disclosure.

The principle of the present disclosure will be described below with reference to several exemplary embodiments illustrated in the drawings.

The term "include" and variants thereof used herein indicate open-ended inclusion, that is, "including but not limited to." Unless otherwise specifically stated, the term "or" means "and/or." The term "based on" means "based at least in part on." The terms "an exemplary embodiment" and "an embodiment" indicate "a group of exemplary embodiments." The term "another embodiment" indicates "a group of other embodiments." The terms "first," "second," and the like may refer to different or identical objects. Other explicit and implicit definitions may also be included below. In addition, a "resource" mentioned herein is used to indicate any types of resources that can be used for allocation and recovery, such as a storage resource and a computing resource. The embodiments of the present disclosure are described below by taking the storage resource as an example, which does not intend to limit the protection scope of the present disclosure.

As discussed above, in a process of implementing storage resource recovery, a storage space may be insufficient because the storage resource is still in a state of being capable of being allocated.

For example, if a storage space recovery task is triggered in a short time, prediction of original available space of a storage system may be inaccurate. Specifically, a module with a storage space consumption prediction function may usually be arranged in the storage system. Under normal circumstances, when the available space in the storage system is close to OOS, the module may give an alarm or notify of exhaustion of a resource, and a user usually tries to release the storage space by deleting some data that is not used or not often used. These sudden storage space recovery tasks have a great impact on a prediction operation of the system's available space, resulting in that original available space trend prediction is not applicable in this case, which makes prediction of the module unreliable.

In addition, recovering the storage space back into an available resource pool of the storage system is a time-consuming task. Specifically, these storage space recovery tasks will be triggered in a short time, and are put into a queue as background tasks so as to be processed by a processor in turn. The resource pool may be full due to many background storage space recovery tasks in the queue during a period of time, which also deteriorates the user experience.

In order to address, at least in part, the above disadvantages, the embodiments of the present disclosure provide a novel solution for resource recovery. The solution quantitatively analyzes an allocated quantity of an available resource and a recovered quantity of a used resource in the system at every moment through mathematical modeling and moreover, reduces the allocated quantity of the available resource and the recovered quantity of the used resource by adjusting a sequence of a plurality of resource recovery tasks, so that a situation of out of space (OOS) or insufficient resources which is undesired by a user can be avoided as much as possible. In addition, even if the situation of out of space or insufficient resources definitely occurs, the solution may also postpone a time point when OOS occurs as much as possible by adjusting the sequence of the plurality of resource recovery tasks.

FIG. 1 shows a schematic diagram of example environment 100 according to an embodiment of the present disclosure. In example environment 100, a device and/or a process according to an embodiment of the present disclosure may be implemented. As shown in FIG. 1, example environment 100 may include user 110, computing device 120, and storage system 130. It should be understood that user 110 can usually operate computing device 120 by an interactive interface arranged on computing device 120. For example, computing device 120 may display a use condition of the storage resource pool to user 110 by monitoring the storage resource pool in storage system 130, and may also recommend storage space or a storage disc capable of being recovered to user 110. User 110 can select one or more storage space or storage discs from the recommended storage space or storage disc capable of being recovered, and trigger a recovery operation by, for example, pressing a key. Furthermore, computing device 120 sends a storage space recovery instruction to storage system 130 on the basis of the recovery operation triggered by user 110.

In some embodiments, computing device 120 may be any device with a computing capability. As a non-limiting example, the computing device may be any type of a fixed computing device, a mobile computing device, or a portable computing device, including but not limited to a desktop computer, a laptop computer, a notebook computer, a netbook computer, a tablet computer, a smart phone, and the like. All or part of the components of the computing device may be distributed in the cloud. The computing device may also adopt a cloud-edge architecture.

In some embodiments, storage system 130 may include but is not limited to a hard disk drive (HDD), a solid state disk (SSD), a removable disk, any other magnetic storage device, and any other optical storage device, or any combination thereof.

A process for resource recovery according to an embodiment of the present disclosure will be described in detail below with reference to FIG. 2. For ease of understanding, specific data mentioned in the following description are all illustrative and are not intended to limit the protection scope of the present disclosure. It can be understood that the embodiment described below may also include additional actions not shown and/or may omit actions shown, and the scope of the present disclosure is not limited in this regard.

FIG. 2 shows a flowchart of process 200 for resource recovery according to an embodiment of the present disclosure. In some embodiments, process 200 may be implemented in computing device 120 in FIG. 1. Process 200 for managing a computing resource according to an embodiment of the present disclosure is now described with reference to FIG. 1. For ease of understanding, specific examples mentioned in the following description are all illustrative and are not used to limit the protection scope of the present disclosure.

As shown in FIG. 2, in 202, computing device 120 may determine a first association relation between a first quantity of a to-be-used resource in storage system 130 and time. In some embodiments, the above system may be a storage system, and the above resource may be a storage resource. Alternatively or additionally, the above system may also be a computing system, and the above resource may also be a computing resource. It should be understood that the above resource may be any type of resources that can be allocated and recovered, and the above system is the corresponding system. A plurality of embodiments involved in the present disclosure will be described below by mainly taking the storage system as an example.

Figure 4A:
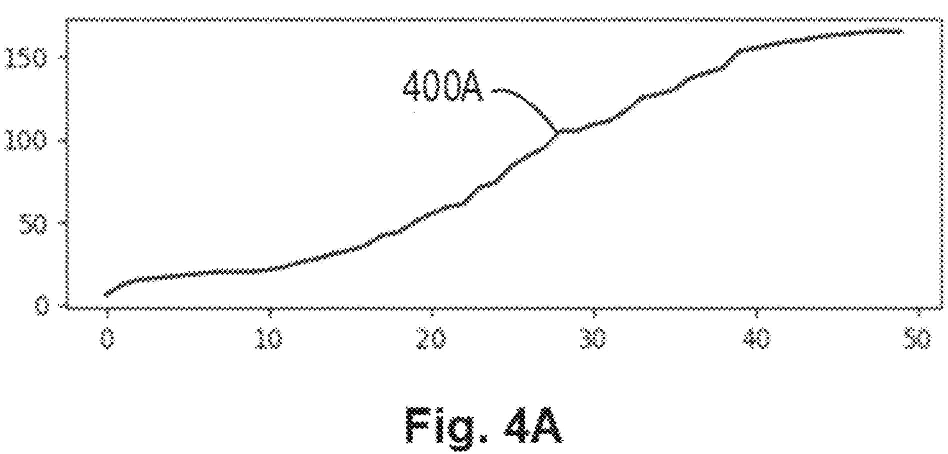
FIG. 4A shows a graph of a first association relation between a first quantity of a used resource and time according to an embodiment of the present disclosure.

In some embodiments, in order to determine the first association relation, computing device 120 may input historical resource use data in storage system 130 into a pre-trained neural network model, and a first function of the first quantity of the to-be-used resource in storage system 130 changing over time is determined by the neural network model to be used as the first association relation. FIG. 4A shows a graph of first association relation 400A between a first quantity of a used resource and time according to an embodiment of the present disclosure. For a detailed description and discussion of the graph, please refer to the following. In this way, the present disclosure may use any prediction mode to determine a change trend of a storage space to be allocated and used in storage system 130.

In 204, computing device 120 may determine a second association relation between a second quantity of a to-be-recovered resource in storage system 130 and time on the basis of a plurality of received resource recovery tasks. In some embodiments, the user can select a plurality of resource recovery tasks on the user interface arranged in computing device 120.

FIG. 3 shows a schematic diagram of user interface 300 for determining a resource recovery task according to an embodiment of the present disclosure. As shown in FIG. 3, user interface 300 may include resource recovery task bar 310 recommended by computing device 120, resource recovery task bar 320 finally selected by the user, and recovery task trigger key 330 to be triggered by clicking from the user. In resource recovery task bar 310, a plurality of resource recovery tasks 301, 302, 303, 304, 305, and 306 recommended by computing device 120 are displayed to the user.

It should be understood that the resource recovery tasks recommended by computing device 120 usually correspond to storage resources that are not used or not often used in storage system 130. As an example, whether a storage disc should be recovered may be determined based on a heat degree of the storage disc (or a logical storage block). In other words, when the heat degree of a storage disc is detected to be lower than a predetermined threshold heat degree, it can be determined that the storage disc is not often used, so computing device 120 may determine the storage disc to be the storage resource that can be recovered and is to be recommended to the user.

In addition, in some embodiments, the plurality of resource recovery tasks may be a task set selected by a user on created user interface 300, and resource recovery is triggered by the user on user interface 300. As an example, the user may select a storage disc or a storage resource that the user desires to recover by dragging or clicking a resource recovery task which is desired to be executed into resource recovery task bar 320. As shown in FIG. 4, tasks 301, 303, and 305 in resource recovery task bar 320 are all resource recovery tasks that the user selects to execute, and after the resource recovery tasks to be executed are selected, the user can click key 330 so as to trigger process 200 for resource recovery of the present disclosure.

In some embodiments, the plurality of above resource recovery tasks may include at least one of a snap deletion job, a file system shrink job, and the like. It should be understood that the snap deletion job usually refers to a task of deleting a system snapshot that is not often used, and the FS shrink job refers to a task of reducing a capacity of a file system.

Figure 4B:
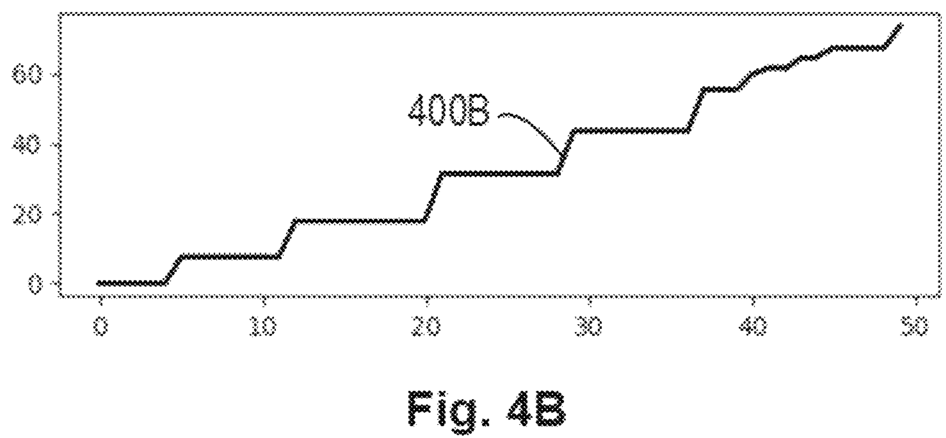
FIG. 4B shows a graph of a second association relation between a second quantity of a to-be-recovered resource and time according to an embodiment of the present disclosure.

In some embodiments, in order to determine the above second association relation, calculation device 120 may estimate a resource quantity and a recovery duration of each resource recovery task among the plurality of resource recovery tasks, and determine a second function of the second quantity of the to-be-recovered resource in storage system 130 changing over time to be used as the second association relation on the basis of the estimated resource quantity and recovery duration. FIG. 4B shows a graph of second association relation 400B between a second quantity of the to-be-recovered resource and time according to an embodiment of the present disclosure. For a detailed description and discussion of the graph, please refer to the following. It should be understood that a change trend of the to-be-recovered storage space can be adjusted.

Figure 4C:
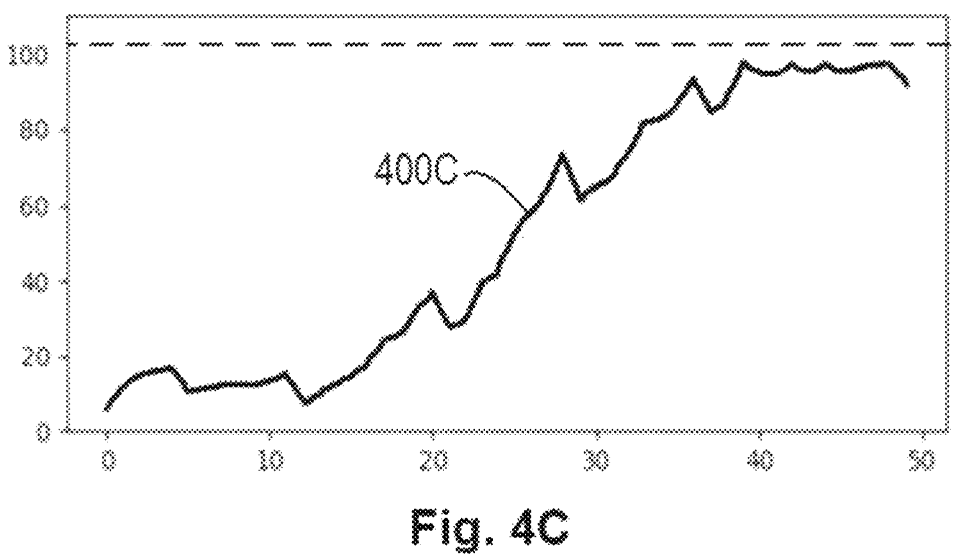
FIG. 4C shows a graph of a third association relation of a difference between a first association relation and a second association relation according to an embodiment of the present disclosure.

In 206, computing device 120 may change second association relation 400B by adjusting a recovery sequence of the plurality of resource recovery tasks so as to adjust the change trend of the to-be-recovered storage space, so that a difference between first association relation 400A and second association relation 400B within a predetermined period is reduced. FIG. 4C shows a graph of third association relation 400C of a difference between a first association relation and a second association relation according to an embodiment of the present disclosure. For a detailed description and discussion of the graph, please refer to the following. The difference between first association relation 400A and second association relation 400B being reduced means that the following situation does not occur, that is, the storage space to be allocated and used is remarkably increased while the to-be-recovered storage space is remarkably reduced, thereby avoiding OOS and improving the user experience.

It should be understood that before or at the same time of determining first association relation 400A and second association relation 400B, computing device 120 can also obtain a third quantity of an available resource in storage system 130. It should also be understood that the third quantity may be a total quantity of the available resource of storage system 130 at a start time point set by the system or the user, which is usually a constant value. In some embodiments, the third quantity may be used to realize minimizing of the difference between first association relation 400A and second association relation 400B. As an example, computing device 120 may determine the recovery sequence of the plurality of resource recovery tasks so that the difference between first association relation 400A and second association relation 400B is smaller than or equal to a threshold quantity within the predetermined period, and the threshold quantity is associated with the third quantity. Alternatively or additionally, the threshold quantity may be set to be lower than the third quantity by a predetermined value. In this way, a problem that compared with the storage space that is allocated and used, there is insufficiency of the recovered storage space plus the original available storage space can be avoided to the greatest degree.

In 208, computing device 120 may execute the plurality of resource recovery tasks on the basis of the adjusted recovery sequence.

Through the above embodiments, the present disclosure can cause the change trend of the to-be-recovered storage resource quantity to adapt to the change trend of the to-be-used storage resource quantity, so that the situation that insufficiency of the storage space occurs at a certain moment is avoided as much as possible, or a time point when insufficiency of the storage space occurs may be postponed as late as possible, and thus OOS alarm can be reduced, and user experience and stickiness are improved.

In order to fully disclose the embodiments of the present disclosure, an influence on the final storage system by adjusting the recovery sequence of the plurality of resource recovery tasks will be described in detail below with reference to FIG. 4A, FIG. 4B, and FIG. 4C.

Parameters and their meanings used by computing device 120 to execute resource recovery are listed as follows:

$t_0$: a time point when user 110 triggers a resource recovery operation;

$\Lambda_t$: the first function of the first quantity of the to-be-used resource and time;

$R_t$: the second function of the second quantity of the to-be-recovered resource and time;

$A_{t0}$: the third quantity of the available resource;

M: the number of resource recovery tasks;

Q: the sequence of resource recovery tasks, specifically, Q=[q1, q2, q3, . . . , qM];

$x_i$: the estimated resource quantity of resource recovery tasks, i=1, . . . , M;

$\mu_i$: the estimated recovery duration of resource recovery tasks, i=1, . . . , M.

It should be understood that the second association relation $R_t$ determined on the basis of the plurality of resource recovery tasks which are in normal sequence may be represented as follows:

$$R_t = \begin{cases} 0, & t_0 < t < t_0 + \mu_1 \\ x_1, & t_0 + \mu_1 \le t < t_0 + \mu_1 + \mu_2 \\ \vdots & \\ \sum_{i=1}^{M-1} x_i, & t_0 + \ldots + \mu_{M-1} \le t < t_0 + \ldots + \mu_M \\ \sum_{i=1}^{M} x_i, & t = t_0 + \ldots + \mu_M \end{cases}, \quad \text{Formula 1}$$

which reveals that the second function $R_t$, namely, second association relation 400B, can be adjusted by adjusting the sequence of the plurality of resource recovery tasks.

In addition, as described above, first association relation 400A is the first function $\Lambda_t$ of the estimated first quantity of the to-be-used resource and time. Therefore, the change trend of the first function is usually known. Accordingly, the difference between the first association relation and the second association relation can be reduced by adjusting the sequence of the plurality of resource recovery tasks, namely, adjusting the second function $R_t$.

It should be understood that an objective of adjusting the sequence of the plurality of resource recovery tasks is to find the following objective:

$$\text{target function: } \min_{R_t} \max_{t_0 < t \le t_0 + sum(\mu_i|_{i=1}^{M})} |\Lambda_t - R_t|. \quad \text{Formula 2}$$

Formula 2 indicates that computing device 120 can minimize the maximum value of the difference between the first association relation and the second association relation within the predetermined period by determining the recovery sequence of the plurality of resource recovery tasks. It should be understood that the predetermined period may be from to $t_0$ a moment after completing the plurality of resource recovery tasks.

It should be understood that computing device 120 can determine a sequence satisfying a requirement among a plurality of sequences to be a sequence of executing the recovery tasks by traversing all sequences of the plurality of resource recovery tasks. Alternatively or additionally, the sequence with a minimum difference may be selected among the plurality of sequences to be used as the sequence of executing the recovery tasks.

In this way, it can be guaranteed that third association relation 400C of the difference between the first association relation and the second association relation remains lower than a predetermined threshold within the predetermined period (represented by a dotted line in FIG. 4C). As mentioned above, if it is determined that third association relation 400C will still exceed the predetermined threshold at last, computing device 120 may delay the time point when OOS occurs as much as possible by adjusting the sequence of the recovery tasks so as to improve the user experience.

It should be understood that FIG. 4A, FIG. 4B, and FIG. 4C are all examples, the horizontal axis thereof is used to represent the time whose unit may be a clock unit, and the vertical axis thereof may be used to represent the quantity of the storage space whose unit may be the number of storage discs. The units of the horizontal axis and the vertical axis may also be set to be other units, such as microseconds, Gigabyte, etc.

Figure 5:
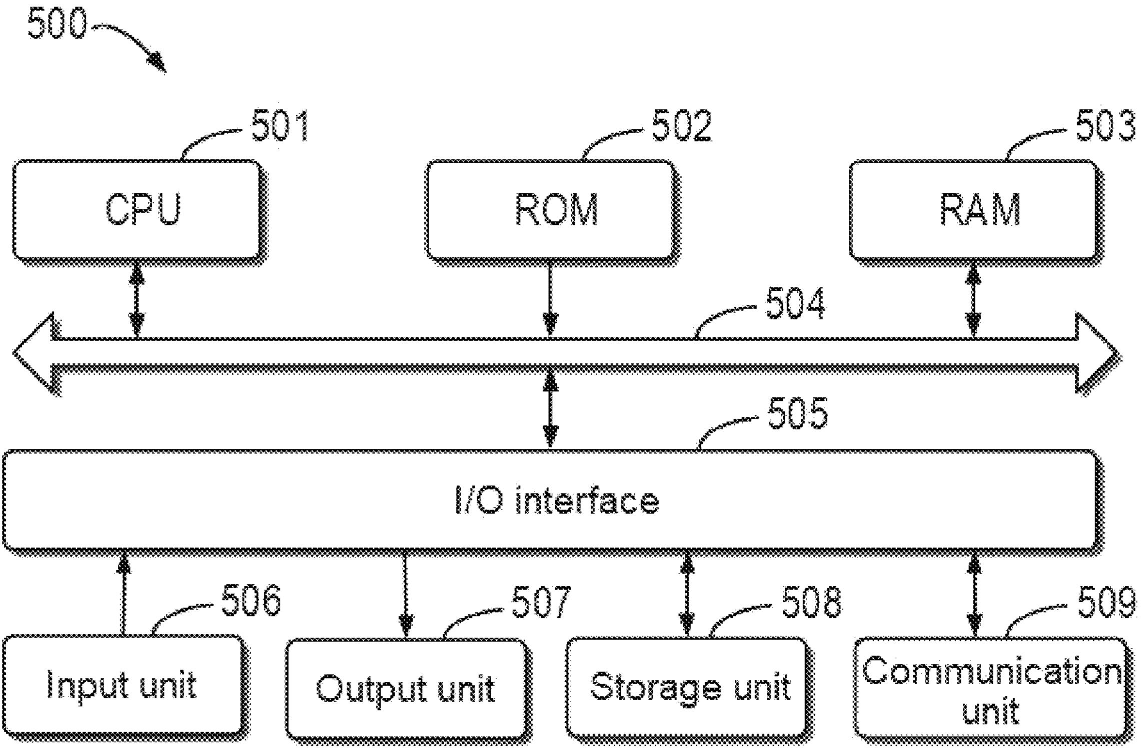
FIG. 5 shows a block diagram of an example device that may be used to implement embodiments of the present disclosure.

FIG. 5 shows a block diagram of example device 500 that may be used to implement embodiments of the present disclosure. For example, electronic device 500 can be used to implement computing device 120 shown in FIG. 1. As shown in the Figure, electronic device 500 includes central processing unit (CPU) 501 that can execute various appropriate actions and processing according to computer program instructions stored in read-only memory (ROM) 502 or computer program instructions loaded from storage unit 508 into random access memory (RAM) 503. Various programs and data needed for operations of device 500 may also be stored in RAM 503. CPU 501, ROM 502, and RAM 503 are connected to one another through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

Processing unit 501 executes the various methods and processing described above, such as process 200. For example, in some embodiments, the various methods and processing described above may be implemented as computer software programs or computer program products, which are tangibly included in a machine-readable medium, such as storage unit 508. In some embodiments, part of or all the computer programs may be loaded into and/or installed to device 500 via ROM 502 and/or communication unit 509. When the computer programs are loaded into RAM 503 and executed by CPU 501, one or more steps of any process described above may be executed. Alternatively, in other embodiments, CPU 501 may be configured in any other suitable manners (for example, by means of firmware) to execute a process such as process 200.

The present disclosure may be a method, an apparatus, a system, and/or a computer program product. The computer program product may include a computer-readable storage medium on which computer-readable program instructions for executing various aspects of the present disclosure are loaded.

The computer-readable storage medium may be a tangible device that may retain and store instructions used by an instruction-executing device. The computer-readable storage medium may be but not limited to, for example, an electrical storage device, a magnetic storage device, an optical storage device, an electromagnetic storage device, a semiconductor storage device, any non-transitory storage device, or any appropriate combination described above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the above. The computer-readable storage medium used herein is not to be construed as a transient signal per se, such as radio waves or other freely propagated electromagnetic waves, electromagnetic waves propagated through a waveguide or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or an external storage device via a network, such as the Internet, a local area network, a wide area network, and/or a wireless network. The network may include a copper transmission cable, fiber optic transmission, wireless transmission, a router, a firewall, a switch, a gateway computer, and/or an edge server. A network adapter card or a network interface in each computing/processing device receives the computer-readable program instructions from a network and forwards the computer-readable program instructions for storage in a computer-readable storage medium in each computing/processing device.

The computer program instructions for executing the operations of the present disclosure may be assembly instructions, instruction set architecture (ISA) instructions, machine instructions, machine-dependent instructions, microcode, firmware instructions, status setting data, or a source code or object code written in any combination of one or more programming languages, the programming languages include object-oriented programming languages such as Smalltalk and C++, and conventional procedural programming languages such as the "C" language or similar programming languages. The computer-readable program instructions may be executed completely on a user computer, partly on a user computer, as a stand-alone software package, partly on a user computer and partly on a remote computer, or completely on a remote computer or a server. In a case where a remote computer is involved, the remote computer may be connected to a user computer through any type of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

Various aspects of the present disclosure are described here with reference to flowcharts and/or block diagrams of the method, the apparatus (system), and the computer program product according to the embodiments of the present disclosure. It should be understood that each block of the flowcharts and/or the block diagrams and combinations of blocks in the flowcharts and/or the block diagrams may be implemented by the computer-readable program instructions.

These computer-readable program instructions may be provided to a processing unit of a general-purpose computer, a special-purpose computer, or other programmable data processing apparatuses, so as to produce a machine, such that these instructions, when executed by the processing unit of the computer or the other programmable data processing apparatus, produce an apparatus for implementing functions/actions specified in one or more blocks in the flowcharts and/or block diagrams. These computer-readable program instructions may also be stored in a computer-readable storage medium, and these instructions enable a computer, a programmable data processing apparatus, and/or other devices to work in a specific manner; and thus the computer-readable medium having instructions stored in it includes a manufacture that includes instructions for implementing various aspects of the functions/actions specified in one or more blocks in the flowcharts and/or block diagrams.

The computer-readable program instructions may also be loaded to a computer, other programmable data processing apparatuses, or other devices, so that a series of operating steps may be executed on the computer, the other programmable data processing apparatuses, or the other devices to produce a computer-implemented process, such that the instructions executed on the computer, the other programmable data processing apparatuses, or the other devices may implement the functions/actions specified in one or more blocks in the flowcharts and/or block diagrams.

The flowcharts and block diagrams in the drawings illustrate architectures, functions, and operations of possible implementations of the system, method, and computer program product according to the plurality of embodiments of the present disclosure. In this regard, each block in the flowcharts or block diagrams may represent a module, a program segment, or part of an instruction, and the module, program segment, or part of an instruction includes one or more executable instructions for implementing specified logical functions. In some alternative implementations, functions marked in the blocks may also occur in a sequence different from a sequence marked in the drawings. For example, two successive blocks may actually be executed in parallel substantially, and sometimes they may also be executed in a reverse sequence, which depends on involved functions. It should be further noted that each block in the block diagrams and/or flowcharts as well as a combination of blocks in the block diagrams and/or flowcharts may be implemented by using a special hardware-based system that executes specified functions or actions, or implemented by using a combination of special hardware and computer instructions.

Various implementations of the present disclosure have been described above. The foregoing description is illustrative rather than exhaustive, and is not limited to the disclosed implementations. Numerous modifications and alterations are apparent to persons of ordinary skill in the art without departing from the scope and spirit of the illustrated implementations. The selection of terms used herein is intended to best explain the principles and practical applications of the implementations or the improvements to technologies on the market, or to enable other persons of ordinary skill in the art to understand the implementations disclosed herein.

What is claimed is:

1. A method, comprising:

determining a first association relation between a first quantity of a to-be-used resource in a system and time by inputting historical resource use data in the system into a pre-trained neural network model and determining a first function of the first quantity changing over time by the neural network model to be used as the first association relation;

determining a second association relation between a second quantity of the to-be-recovered resource in the system and the time on a basis of a plurality of received resource recovery tasks, wherein the second quantity of the to-be-recovered resource are associated with resources to-be-recovered by the plurality of received resource recovery tasks;

changing the second association relation by adjusting a recovery sequence of the plurality of received resource recovery tasks so as to minimize a maximum value of a difference between the first association relation and the second association relation within a predetermined period, wherein the first association relation and the second association relation are each functions of time; and executing the plurality of received resource recovery tasks on a basis of the adjusted recovery sequence, and wherein the predetermined period is between to and a moment after completing execution of the plurality of received resource recovery tasks.

2. The method according to claim 1, further comprising: obtaining a third quantity of an available resource in the system, wherein changing the second association relation by adjusting the recovery sequence so as to reduce the difference comprises:

determining the recovery sequence so that the difference is smaller than or equal to a threshold quantity within the predetermined period, wherein the threshold quantity is associated with the third quantity.

3. The method according to claim 1, wherein changing the second association relation by adjusting the recovery sequence so as to reduce the difference comprises:

determining the recovery sequence to minimize a maximum value of the difference within the predetermined period.

4. The method according to claim 1, wherein determining the second association relation on the basis of the plurality of received resource recovery tasks comprises:

estimating a resource quantity and a recovery duration of each resource recovery task among the plurality of received resource recovery tasks; and determining a second function of the second quantity changing over time on the basis of the estimated resource quantity and recovery duration to be used as the second association relation.

5. The method according to claim 1, wherein the system is a storage system, and the resource is a storage resource.

6. The method according to claim 1, wherein the plurality of received resource recovery tasks comprise at least one of the following:

a snap deletion job; and a file system shrink job.

7. The method according to claim 1, wherein the plurality of received resource recovery tasks are a task set selected by a user on a created user interface, and the resource recovery is triggered by the user on the user interface.

8. A system, comprising:

at least one processing device comprising a processor; and a memory, coupled to the processor and having an instruction stored therein, wherein the instruction, when executed by the processor, causes the system to execute actions, and the actions comprise:

determining a first association relation between a first quantity of a to-be-used resource in a system and time by inputting historical resource use data in the system into a pre-trained neural network model and determining a first function of the first quantity changing over time by the neural network model to be used as the first association relation;

determining a second association relation between a second quantity of the to-be-recovered resource in the system and the time on a basis of a plurality of received resource recovery tasks, wherein the second quantity of the to-be-recovered resource are associated with resources recovered by the recovery tasks;

changing the second association relation by adjusting a recovery sequence of the plurality of received resource recovery tasks so as to minimize a maximum value of a difference between the first association relation and the second association relation within a predetermined period, wherein the first association relation and the second association relation are each functions of time; and executing the plurality of received resource recovery tasks on a basis of the adjusted recovery sequence, and wherein the predetermined period is between to and a moment after completing execution of the plurality of received resource recovery tasks.

9. The system according to claim 8, wherein the actions further comprise:

obtaining a third quantity of an available resource in the system, wherein changing the second association relation by adjusting the recovery sequence so as to reduce the difference comprises:

determining the recovery sequence so that the difference is smaller than or equal to a threshold quantity within the predetermined period, wherein the threshold quantity is associated with the third quantity.

10. The system according to claim 8, wherein changing the second association relation by adjusting the recovery sequence so as to reduce the difference comprises:

determining the recovery sequence to minimize a maximum value of the difference within the predetermined period.

11. The system according to claim 8, wherein determining the first association relation comprises:

inputting historical resource use data in the system into a pre-trained neural network model; and determining a first function of the first quantity changing over time by the neural network model to be used as the first association relation.

12. The system according to claim 8, wherein determining the second association relation on the basis of the plurality of received resource recovery tasks comprises:

estimating a resource quantity and a recovery duration of each resource recovery task among the plurality of received resource recovery tasks; and determining a second function of the second quantity changing over time on the basis of the estimated resource quantity and recovery duration to be used as the second association relation.

13. The system according to claim 8, wherein the system is a storage system, and the resource is a storage resource.

14. The system according to claim 8, wherein the plurality of received resource recovery tasks comprise at least one of the following:

a snap deletion job; and a file system shrink job.

15. The system according to claim 8, wherein the plurality of received resource recovery tasks are a task set selected by a user on a created user interface, and the resource recovery is triggered by the user on the user interface.

16. A non-transitory computer-readable medium comprising a machine-executable instruction, wherein the machine-executable instruction, when executed, causes a machine to:

determine a first association relation between a first quantity of a to-be-used resource in a system and time by inputting historical resource use data in the system into a pre-trained neural network model and determining a first function of the first quantity changing over time by the neural network model to be used as the first association relation;

determining a second association relation between a second quantity of the to-be-recovered resource in the system and the time on a basis of a plurality of received resource recovery tasks, wherein the second quantity of the to-be-recovered resource are associated with resources recovered by the recovery tasks;

changing the second association relation by adjusting a recovery sequence of the plurality of received resource recovery tasks so as to minimize a maximum value of a difference between the first association relation and the second association relation within a predetermined period, wherein the first association relation and the second association relation are each functions of time; and execute the plurality of received resource recovery tasks on a basis of the adjusted recovery sequence, and wherein the predetermined period is between to and a moment after completing execution of the plurality of received resource recovery tasks.

17. The non-transitory computer-readable medium of claim 16 further comprising:

obtaining a third quantity of an available resource in the system, wherein changing the second association relation by adjusting the recovery sequence so as to reduce the difference comprises:

determining the recovery sequence so that the difference is smaller than or equal to a threshold quantity within the predetermined period, wherein the threshold quantity is associated with the third quantity.

18. The non-transitory computer-readable medium of claim 16, wherein changing the second association relation by adjusting the recovery sequence so as to reduce the difference comprises:

determining the recovery sequence to minimize a maximum value of the difference within the predetermined period.

19. The non-transitory computer-readable medium of claim 16, wherein determining the first association relation comprises:

inputting historical resource use data in the system into a pre-trained neural network model; and determining a first function of the first quantity changing over time by the neural network model to be used as the first association relation.

* * * * *